(12) United States Patent
El Jihad et al.

(10) Patent No.: US 11,876,457 B2
(45) Date of Patent: Jan. 16, 2024

(54) METHOD OF CONTROL FOR POWER CONVERTER, ASSOCIATED SYSTEM AND DEVICE

(71) Applicant: GE Energy Power Conversion Technology Limited, Warwickshire (GB)

(72) Inventors: Hamza El Jihad, Villebon sur Yvette (FR); Elise Savarit, Massy (FR); Sami Siala, Villebon sur Yvette (FR)

(73) Assignee: GE Energy Power Conversion Technology Limited, Warwickshire (GB)

( * ) Notice: Subject to any disclaimer, the term of this patent is extended or adjusted under 35 U.S.C. 154(b) by 315 days.

(21) Appl. No.: 17/294,317

(22) PCT Filed: Nov. 12, 2019

(86) PCT No.: PCT/EP2019/080981
§ 371 (c)(1),
(2) Date: May 14, 2021

(87) PCT Pub. No.: WO2020/099377
PCT Pub. Date: May 22, 2020

(65) Prior Publication Data
US 2022/0014133 A1    Jan. 13, 2022

(30) Foreign Application Priority Data
Nov. 14, 2018 (FR) ..................................... 1860477

(51) Int. Cl.
*H02M 1/00* (2006.01)
*H02M 7/5395* (2006.01)
*H02M 5/293* (2006.01)

(52) U.S. Cl.
CPC ....... *H02M 5/2932* (2021.05); *H02M 1/0025* (2021.05); *H02M 7/5395* (2013.01)

(58) Field of Classification Search
CPC . H02M 7/5395; H02M 1/0045; H02M 1/0025
See application file for complete search history.

(56) References Cited

U.S. PATENT DOCUMENTS 6,144,924 A * 11/2000 Dowling .............. G01R 31/343
702/60
6,992,448 B2 * 1/2006 Fujimoto .................. H02P 6/28
388/934

(Continued)

FOREIGN PATENT DOCUMENTS

JP    2005531270 A    10/2005
JP    2012139092 A     7/2012

(Continued)

OTHER PUBLICATIONS

International Search Report from International Appl. No. PCT/EP2019/080981, dated Jan. 28, 2020.

(Continued)

*Primary Examiner* — Sisay G Tiku
(74) *Attorney, Agent, or Firm* — WOOD IP LLC (57) ABSTRACT

A method of controlling of a polyphase power converter driven by an algorithm of the pulse width modulation type, in which a control parameter comprising a drive setpoint value or a pulse duration associated with a value of drive setpoint of at least one phase, situated in a non-linearity zone of a chart, is modified by modifying the value of said parameter so that it is in a linearity zone of the chart. The control parameter of each of the phases is modified in the same manner.

8 Claims, 7 Drawing Sheets

(56) References Cited

U.S. PATENT DOCUMENTS

| | | | | |
|---|---|---|---|---|
| 8,054,032 B2* | 11/2011 | Chakrabarti | ............ | B60L 58/20 363/133 |
| 2001/0015904 A1* | 8/2001 | Kimura | ................ | H02M 7/538 363/131 |
| 2001/0050592 A1* | 12/2001 | Wright | ................ | H03F 1/3241 330/149 |
| 2007/0133242 A1* | 6/2007 | Welchko | ........... | H02M 7/53871 363/131 |
| 2007/0216341 A1* | 9/2007 | Gataric | ................ | H02P 27/12 318/807 |
| 2009/0034303 A1* | 2/2009 | Chakrabarti | ............ | B60L 58/20 363/133 |
| 2009/0069142 A1* | 3/2009 | Welchko | ................ | B60K 6/445 475/276 |
| 2009/0179608 A1* | 7/2009 | Welchko | ........... | H02M 7/53875 318/811 |
| 2012/0320650 A1* | 12/2012 | Weinmann | ........ | H02M 7/53875 363/132 |
| 2017/0179844 A1* | 6/2017 | Schumacher | ..... | H02M 7/53873 |
| 2018/0175627 A1* | 6/2018 | Woodburn | ............. | B64D 33/00 |

FOREIGN PATENT DOCUMENTS

| | | |
|---|---|---|
| JP | 2017158280 A | 9/2017 |
| WO | 2020/099377 A1 | 5/2020 |

OTHER PUBLICATIONS

Brian A. Welchko et al., "Effects and Compensation of Dead-Time and Minimum Pulse-Width Limitations in Two-Level PWM Voltage Source Inverters," The 2006 IEEE Industry Applications Conference Forty-First IAS Annual Meeting, Conference Record of, IEEE, Piscataway, NJ, US, Oct. 1, 2006 (Oct. 1, 2006), pp. 889-896.

JP Notice of Reasons for Refusal for Japanese Application No. 2021-526265 dated Jun. 7, 2023, 7 pages.

* cited by examiner

METHOD OF CONTROL FOR POWER CONVERTER, ASSOCIATED SYSTEM AND DEVICE

The present invention relates to the control in voltage of a power converter and relates more particularly to a method for optimizing a control of a polyphase power converter, a device for implementing the method and a system of control in voltage comprising the device.

The power converters comprise power semiconductor components, generally field-effect transistors.

Physical characteristics intrinsic to the semi-conductors impose a minimum duration of conduction or of blocking during which the power semi-conductor has to remain in an on or off state to prevent the destruction thereof.

For example for an insulated gate bipolar transistor (IGBT), the minimum duration of conduction or of blocking varies from 5 to 30 μs.

The current algorithms for controlling power converters in voltage, in particular control algorithms of the pulse width modulation (PWM) type, prohibit any switching duration less than the minimum duration, for example by modifying the control value of a phase of which the switching duration of the semiconductors is less than the minimum duration in such a way as to modify the width of the associated pulse.

A value calculated from a predefined value is added to subtracted from the drive setpoint value or the duration of the pulse associated with the driving setpoint of the phase in such a way as to cancel or increase the duration of conduction of the semiconductors.

Indeed, it is preferable that the semiconductor component be blocked instead of conducting for a duration less than its minimum duration of conduction.

A chart depending on semiconductor technology can be used to determine the predefined values according to the driving value or the duration of the associated pulse.

However, the adding or the subtracting of the predefined value from the voltage driving setpoint of a phase generally causes a distortion in the output voltage of the power converter with respect to the reference voltage without intervention of the control algorithms.

Figure 1:
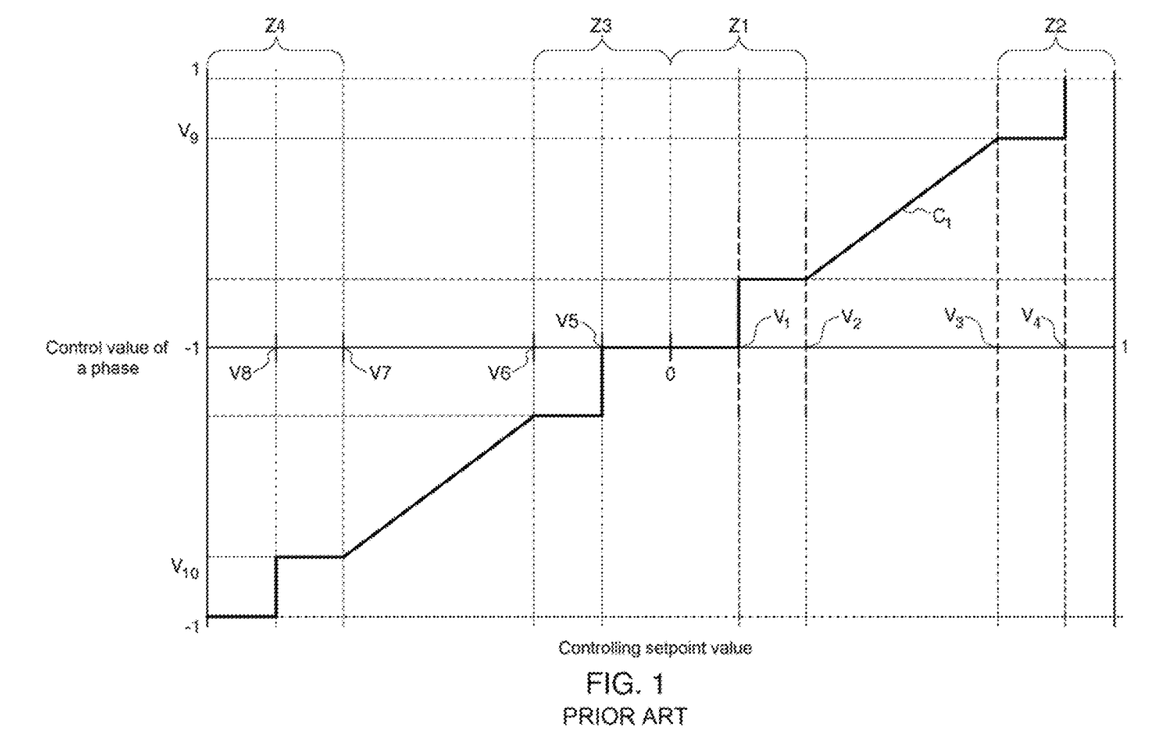
FIG. 1, which has already been mentioned, shows an example of a correction chart of the value of a control reference signal of a phase.
Figure 2:
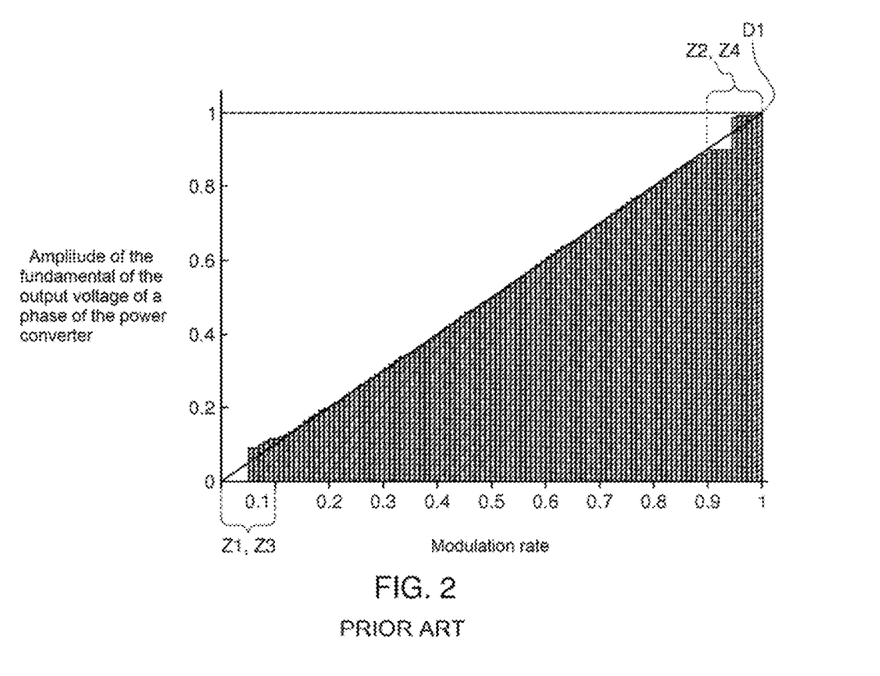
FIG. 2, which has already been mentioned, shows an example of the amplitude of the fundamental of the voltage of a phase at the output of the converter according to the modulation rate.

Reference is made to FIGS. 1 and 2 that respectively show an example of a chart ABQ for correcting the value of a control reference signal of a phase and an example of the amplitude of the fundamental of the voltage of a phase at the output of the converter according to the modulation rate.

Reference is made more particularly to FIG. 1.

The control value of a phase is determined according to the initial drive setpoint value according to a normalized curve C1.

The curve C1 is symmetrical with respect to a zero value of the control signal. Focus is given to the positive values of the reference signal.

If the drive setpoint value is within the intervals [0, V2] (zone Z1) or [V3, 1] (zone Z2), the control value is no longer proportional to the initial drive setpoint value.

The non-linearity zones Z1 and Z2 cause a non-optimum operation of the power converter in these two control value intervals.

If the drive setpoint value is located outside these intervals, the control value is proportional to the reference signal. The control is linear.

By symmetry, the zones Z3 and Z4 defined by the intervals [V6, 0] and [−1, V7] are non-linearity zones.

The zones Z1, Z2, Z3 and Z4 each comprise an intermediate point V1, V4, V5 and V8 when the curve C1 has a tier.

The values V1, V2, V3 and V4 are positive and the values V5, V6, V7 and V8 are negative.

For example, V2 is equal to −V6, V3 is equal to −V7, V1 is equal to V2/2, V4 is equal to 1−V2/2, V5 is equal to V6/2 and V8 is equal to −1+V6/2.

Of course, for certain applications, in particular multi-level applications, the chart ABQ can comprise more than three non-linearity zones distributed on the curve C1.

The shape and the slope of the curve C1 in said non-linearity zones can be different from one zone to another.

In FIG. 2, the straight line D1 represents optimum operation of the power converter when the amplitude of the fundamental is proportional to the modulation rate, when the drive setpoint value is not within any of the zones Z1, Z2, Z3 and Z4.

However, the non-linearity zones Z1, Z2, Z3 and Z4 are found where the amplitude of the fundamental is no longer proportional to the setpoint in modulation rate.

An operation of the converter in one of these non-linearity zones drives a drop in the performance of the converter.

As the output voltage of a phase is modified in the non-linearity zones Z1, Z2, Z3 and Z4, distortions appear in the supply voltages generated by the converter.

The value of the voltage between the phases is no longer constant. Consequently, the output voltage system of the converter is no longer balanced and harmonics appear.

Figure 3:
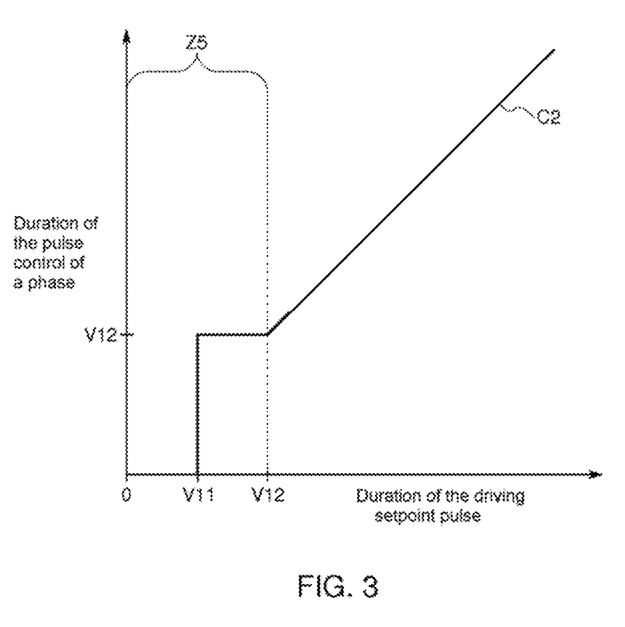
FIG. 3, which has already been mentioned, shows an example of a correction chart of the duration of the pulse associated with a control reference signal of a phase.

FIG. 3 shows an example of a control chart ABQ1 of a phase according to the duration of the pulse associated with a drive setpoint value.

The duration of the control pulse of a phase is determined according to the duration of the initial driving setpoint pulse according to a normalized curve C2.

If the duration of the driving setpoint pulse is within the interval [0, V12] (zone Z5), the duration of the control pulse is no longer proportional to the duration of the initial driving setpoint pulse.

As described hereinabove, distortions appear in the supply voltages generated by the converter.

It is therefore proposed to overcome the disadvantages linked to the control of a power converter controlled in voltage according to the prior art, in particular by reducing the non-linear operating zones of the power converter and by adjusting the width of the pulses of the output voltages of the converter in such a way that the voltage system at the output of the converter is substantially balanced.

In light of the above, according to a first aspect, a method of control of a polyphase power converter driven by an algorithm of the pulse width modulation type is proposed, wherein a control parameter comprising a drive setpoint value or a pulse duration associated with a drive setpoint value of at least one phase situated in a non-linearity zone of a chart is modified by modifying the value of said parameter so that it is in a linearity zone of the chart.

The control parameter of each of the phases is modified in the same manner.

The method comprises:

a) a first step during which at least one corrective value associated by the chart with the control parameter is determined;

b) a second step during which a set of differences between each of the corrective values and the control parameter is determined; and c) a third step (42) during which the corrective value associated with the smallest difference is selected, a driving value is determined for each phase by subtracting the difference associated with said corrective value of the control parameter if the corrective value is less than the control parameter situated in a non-linearity zone or by adding the difference associated with said corrective value to the control parameter if the corrective value is greater than the control parameter situated in a non-linearity zone, and it is determined if each control parameter is situated in a non-linearity zone of the chart.

If the driving value of all the phases is situated in a linearity zone of the chart, during a step, new control parameters are transmitted comprising said driving values to a driving device able to control the polyphase converter.

If the driving value of at least one phase is located in a non-linearity zone of the chart and if more than one value subsists in all the differences, during a step, the previously selected difference is deleted and said third step is reiterated.

If the driving value of a phase is located in a non-linearity zone of the chart and if all the differences are empty, during a step, the control parameters are selected and the driving value of the phase in a non-linearity zone is calculated by subtracting the smallest difference from the control parameter of the phase if the corrective value associated with the smallest difference is less than the control parameter of the phase or by adding the smallest difference to the control parameter of the phase if the corrective value associated with the smallest difference is greater than the control parameter of the phase, and the new control parameters are transmitted comprising said driving value and each control parameter of the other phases to a driving device able to control the polyphase converter.

If a control parameter of at least two phases is located in a non-linearity zone of the chart, and if all the differences are empty, different combinations of corrective values are determined each forming a driving vector, each driving vector is transformed into a two-dimensional driving vector, a control parameter vector comprising the control parameter of each of the phases is transformed into a two-dimensional reference vector, the quadratic error of each two-dimensional driving vector is determined with respect to the two-dimensional reference vector and the two-dimensional driving vector associated with the smallest error is determined.

Advantageously, the method comprises a step during which the two-dimensional driving vector associated with the smallest error is transformed into a control parameter vector and the combination of control parameters is transmitted to a driving device able to control the three-phase converter.

According to another aspect, a system for optimizing a control for a polyphase power converter is proposed.

It comprises means for implementing a method of control such as defined hereinabove in such a way that the polyphase power converter delivers a substantially balanced system of voltages.

According to yet another aspect, a system of control in voltage of a polyphase power converter for the implementation of a method such as defined hereinabove is proposed.

It comprises a regulation device able to generate for each phase a drive setpoint value, a control optimization system receiving a drive setpoint value delivered by the regulation device and able to control the converter, the optimization system delivering a driving value developed from the drive setpoint value in such a way that the polyphase power converter delivers a substantially balanced voltage system.

Other characteristics and advantages of the invention shall appear when reading the following description of embodiments of the invention, given solely as non-limiting examples and in reference to the drawings wherein.

Figure 4:
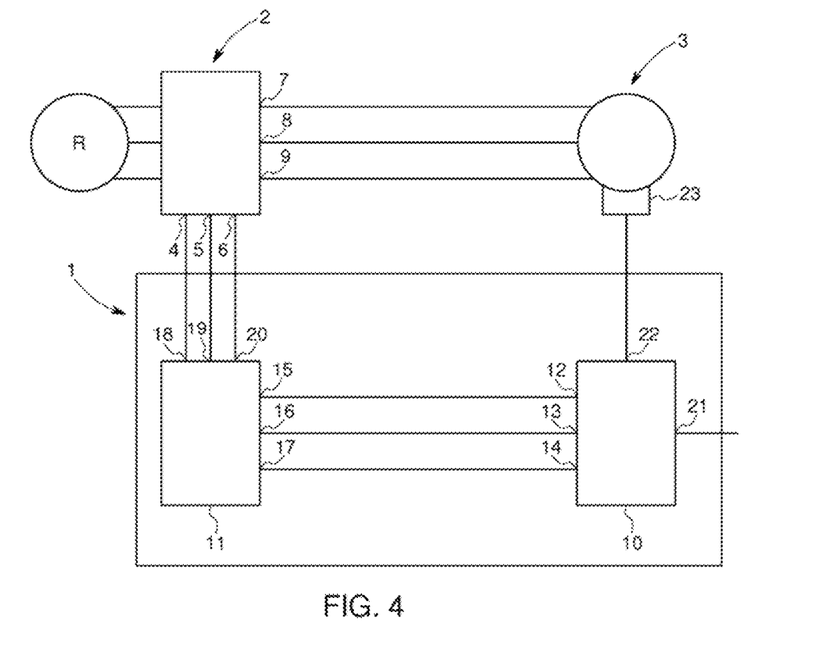
FIG. 4 shows an embodiment of a system of control in voltage of a polyphase power converter.

Reference is made to FIG. 4 that shows an embodiment of an electrical power supply of a load, formed here by an electric motor, comprising a voltage control system 1 and a polyphase power converter controlled in voltage by the control system and supplying the load 3.

The power converter 2 is for example a three-phase converter.

The power converter 2 comprises a power circuit connected to a three-phase electrical power supply network R.

The converter 2 advantageously comprises semiconductor switching components, for example IGBT transistors.

The converter 2 comprises three control inputs 4, 5 and 6 providing the control of the switching of the semiconductor components. These inputs are connected to the system of control 1 and drive respective outputs 7, 8 and 9 of the converter 2 connected to the motor 3, with each output corresponding to a phase of the output voltage system of the converter.

The system of control 1 comprises a regulation device 10 connected to an optimization system 11.

The regulation device 10 comprises three outputs 12, 13 and 14 connected to respective inputs 15, 16 and 17 of the optimization system 11.

The outputs 18, 19 and 20 of the optimization system 11 are connected respectively to the control inputs 4, 5 and 6 of the converter 2.

The regulation device 10 elaborates a drive setpoint value for each of the phases 7, 8 and 9 of the converter 2 from a setpoint received on a first input 21 and measurements received on a second input 22. It comprises a regulation loop able to drive the motor 3 from the setpoint, for example a setpoint as torque.

The measurements received as input of the device come from means of measurement 23 equipping the motor 3.

Figure 5:
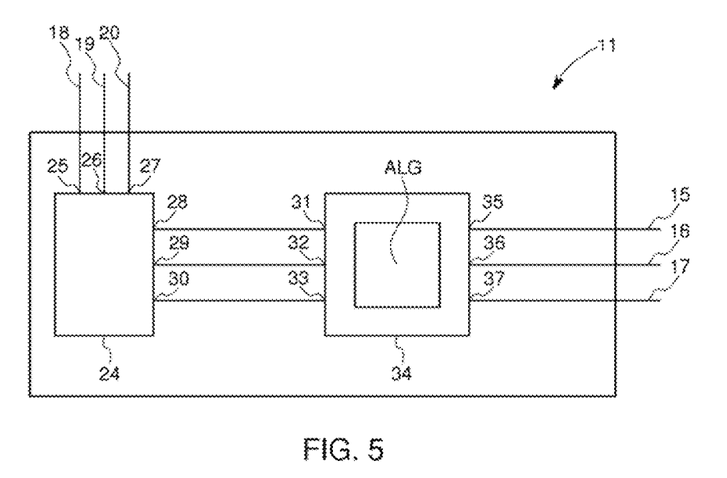
FIG. 5 shows a first embodiment of an optimization device.

FIG. 5 shows a first embodiment of the optimization system 11.

The optimization system 11 comprises a driving device of the converter 24 and an optimization device 34.

The driving device 24 comprises three outputs 25, 26 and 27 connected respectively to the outputs 18, 19 and 20 of the optimization system 11, and three inputs 28, 29 and 30 connected respectively to the outputs 31, 32 and 33 of the optimization device 34.

The optimization device 34 comprises three inputs 35, 36, and 37 connected respectively to the inputs 15, 16 and 17 of the optimization system 11.

The driving device 24 generates for each of the phases 7, 8 and 9 a control value from driving values determined by the optimization device 34 according to the pulse width modulation (PWM) technique. The signals received on the inputs 28, 29 and 30 of the driving device 24 are thus the control modulating signals of the converter 2.

The optimization device 34 implements an optimization algorithm ALG, a function of which is to optimize the control in voltage of the power converter 2 for each one of its outputs 31, 32 and 33 delivers a driving value such that the converter 2 delivers a substantially balanced system of voltages.

"Substantially balanced" means that the values of the three voltages between phases of the three-phase voltage system are equal to a degree of tolerance and out of phase by $2\pi/3$ between them.

To do this, the algorithm ALG modifies a control parameter comprising a drive setpoint value of at least one phase located in a non-linearity zone of the chart ABQ by modifying the value of said parameter so that it is in a linearity zone of the chart ABQ and it modifies a drive setpoint value of each of the phases in the same manner.

The optimization device 34 is for example carried out from a processing unit comprising a microprocessor. It can however be any device that can implement the algorithm ALG.

In what follows, the elements identical to those described hereinabove are designated by the same numerical references.

Figure 6:
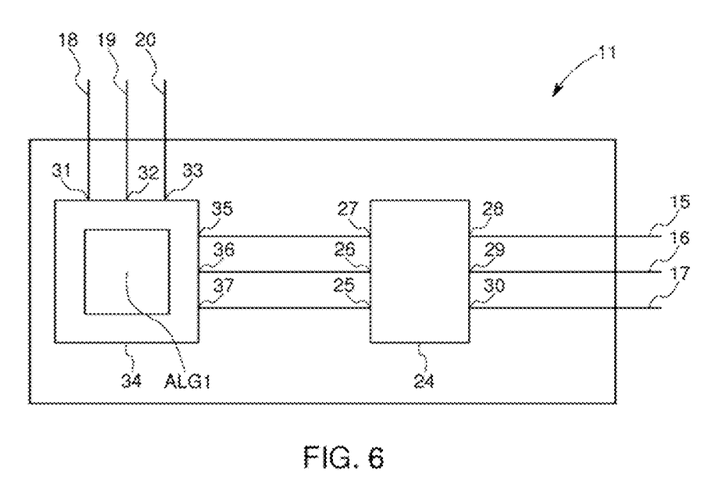
FIG. 6 shows a second embodiment of an optimization device.

Reference is made to FIG. 6 that describes a second embodiment of the optimization system 11.

The devices for driving the converter 24 and for optimizing 34 are found.

The outputs 31, 32 and 33 of the optimization device 34 are connected respectively to the outputs 18, 19 and 20 of the optimization system 11, and the inputs 35, 36, and 37 of the optimization device 34 are connected respectively to the outputs 25, 26 and 27 of the optimization system 24.

The inputs 28, 29 and 30 of the driving device 24 are connected respectively to the inputs 15, 16 and 17 of the optimization system 11.

The optimization device 34 implements an optimization algorithm ALG1 having for function to optimize the control in voltage of the power converter 2 so that each of its outputs 31, 32 and 33 delivers a driving value such that the converter 2 delivers a substantially balanced system of voltages.

To do this, the algorithm ALG1 modifies a control parameter comprising a pulse duration associated with a drive setpoint value of at least one phase located in a non-linearity zone of the chart ABQ1 by modifying the value of said parameter so that it is in a linearity zone of the chart ABQ1 and it modifies a pulse duration associated with a drive setpoint value of each of the phases in the same manner.

The algorithms ALG and ALG1 differ in that the algorithm ALG modifies at least one drive setpoint value located in a non-linear domain of the chart ABQ and the algorithm ALG1 modifies at least one pulse duration associated with a drive setpoint value located in a non-linear domain of the chart ABQ1.

The algorithms ALG and ALG1 operate in the same manner by each processing a different control parameter of the converter and by using different charts.

Figure 7:
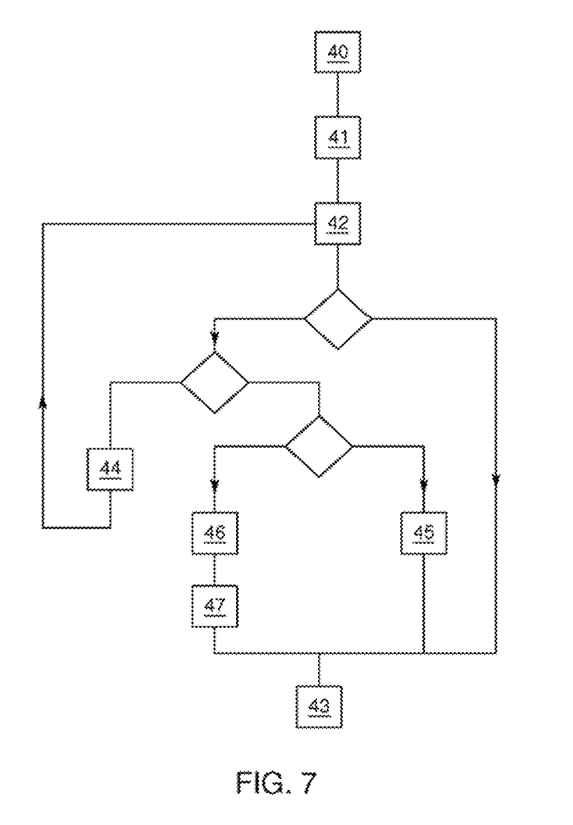
FIG. 7 shows an example embodiment of a control algorithm in voltage of a polyphase power converter.

Reference is now made to FIG. 7 that shows an example of the implementation of the algorithm ALG for optimizing the control in voltage of the polyphase power converter.

The implementation of the algorithm ALG1 is identical to that of the algorithm ALG by replacing the driving setpoint values with the durations of the pulses associated with the driving setpoint values and by replacing the chart ABQ with the chart ABQ1.

It is supposed that a drive setpoint value of at least one of the phases 7, 8 and 9 is situated in a non-linearity zone Z1, Z2, Z3 or Z4 of the chart ABQ.

It is supposed here that the drive setpoint value of the phase 7 is situated in the non-linearity zone Z2.

During a first step 40, the optimization device 34 determines a set of two corrective values associated by the chart with the drive setpoint value.

For the phase 7, the optimization device 34 retains the corrective values V3 and 1.

However, when the drive setpoint value of each one of the three phases is situated in a non-linearity zone, the optimization device 34 determines six control values, with two control values being associated with each phase.

During a second step 41, the optimization device 34 determines a set of differences between each of the corrective values V3 and 1, and the drive setpoint value.

In step 42, the optimization device selects the corrective value associated with the smallest difference.

Then the optimization device determines a driving value pour each phase by subtracting the associated difference from said corrective value of the drive setpoint value if the corrective value is less than the drive setpoint value located in a non-linearity zone or by adding the difference associated with said corrective value to the drive setpoint value if the corrective value is greater than the drive setpoint value located in a non-linearity zone.

Finally, the optimization device determines if each driving value is situated in a non-linearity zone of the chart ABQ.

If all the driving values are located in a linearity zone of the chart ABQ, during a step 43, the optimization device 34 transmits new control parameters comprising the driving values to the driving device 24.

During the implementation of the algorithm ALG1, the driving values are transmitted directly to the inputs 4, 5 and 6 of the power converter 2 comprising a driving device.

If the driving value of a phase is located in a non-linearity zone of the chart ABQ and if more than one value subsists in all the differences, during a step 44, the optimization device 34 suppresses the previously selected difference in step 42.

Then we return to the third step 42.

If a driving value of a phase is located in a non-linearity zone of the chart ABQ and if all the differences are empty, during the following step 45, the optimization device 34 selects the control parameters and calculates the driving value of the phase in the non-linearity zone by subtracting the smallest difference of the drive setpoint value of the phase if the corrective value associated with the smallest difference is less than the drive setpoint value of the phase or by adding the smallest difference to the drive setpoint value of the phase if the corrective value associated with the smallest difference is greater than the drive setpoint value of the phase.

Then the optimization device 34 transmits the value of new control parameters comprising said driving value and the drive setpoint value of each of the other phases received from the regulation device 10 to the driving device 24.

During the implementation of the algorithm ALG1, the optimization device 34 transmits the driving value directly to the inputs 4, 5 and 6 of the power converter 2 comprising a driving device.

If at least one driving value of at least two phases is located in a non-linearity zone of the chart ABQ and if all the differences are empty, during a step 46, the optimization device 34 determines four different combinations of corrective values.

Each combination forms a driving vector.

The optimization device 34 transforms each driving vector into a two-dimensional driving vector and transforms a control parameter vector comprising the drive setpoint value of each of the phases into a two-dimensional reference vector for example by using the Clarke transform.

The optimization device 34 determines the quadratic error of each two-dimensional driving vector with respect to the two-dimensional reference vector and determines the two-dimensional driving vector associated with the smallest error.

Then, in a step 47, the optimization device 34 transforms the two-dimensional driving vector associated with the smallest error into a control parameter vector and transmits the combination of the driving setpoint values to the driving device 24.

The algorithms ALG and ALG1 are implemented each time that one of the control values or one of the driving values of a phase is situated in a non-linearity zone.

Figure 8:
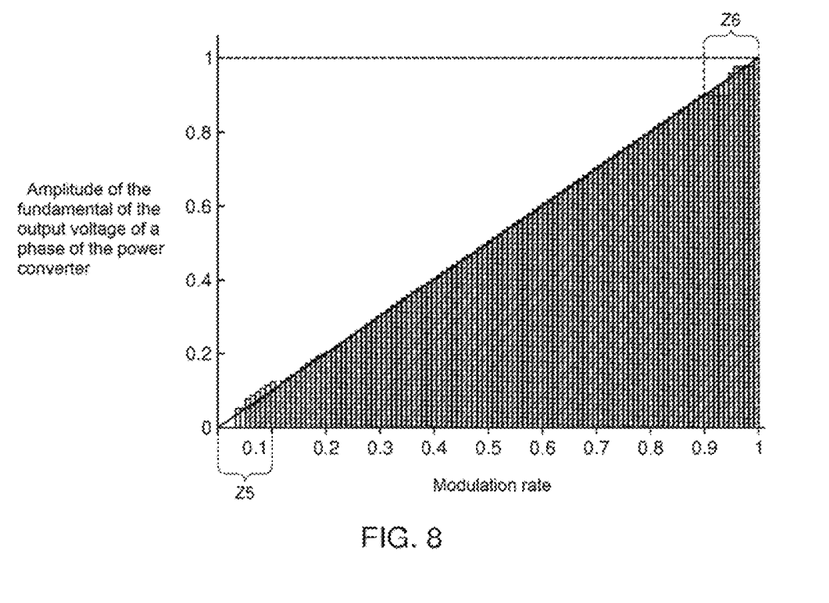
FIG. 8 shows the amplitude of the fundamental of the voltage of a phase at the output of the converter according to the modulation rate with the algorithm proposed by this invention.

Reference is made to FIG. 8 that shows an example of the amplitude of the fundamental of the voltage of a phase 7, 8 and 9 at the output of the converter according to the modulation rate.

The amplitude of the fundamental of the voltage of a phase is proportional to the modulation rate on the additional ranges Z5 and Z6.

Advantageously, the linear operating zone of the power converter has been extended.

The power converter is driven in such a way that the output voltages of the converter form a voltage system at the output of the converter that is balanced or substantially balanced.

For example, the linearity zone of the modulation rate is increased by 4 to 9%.

Consequently, the value of the output voltages of the converter is higher in the domains included in the linearity zone of the modulation rate.

At equal factors of power and intensity, the value of the electrical power transmitted by the converter is higher during the use of the optimization device.

In addition, the optimization device also operates when the electrical power is transferred from the electrical load to the network, for example when the motor 3 is operating in generating mode.

Preferably, when the modulation rate is within a non-linearity zone located in the vicinity of the zero value, a generally square homopolar signal is added to the modulating signal in such a way that the control parameter is in a linearity zone, and the control parameter of each of the phases is modified in the same manner so as to guarantee the linearity until a zero modulation rate.

This technique is known as "Toggle PWM".

The invention claimed is:

1. A method for controlling a polyphase power converter driven by an algorithm of a pulse width modulation type, wherein a control parameter comprising a drive setpoint value or a pulse duration associated with the drive setpoint value of at least one phase situated in a non-linearity zone of a chart, is modified by modifying the value of said parameter so that it is in a linearity zone of the chart, and the control parameter of each of the phases is modified in the same manner, characterized in that the method comprises:
   a) a first step during which at least one corrective value associated by the chart with the control parameter is determined;
   b) a second step during which a set of differences between each of the corrective values and the control parameter is determined; and
   c) a third step during which the corrective value associated with a smallest of the difference determined in step b) is selected, a driving value is determined for each phase by subtracting the difference associated with said corrective value of the control parameter if the corrective value is less than the control parameter situated in the non-linearity zone or by adding the difference associated with said corrective value to the control parameter if the corrective value is greater than the control parameter situated in the non-linearity zone, and it is determined if each control parameter is situated in the non-linearity zone of the chart.

2. The method of claim 1, wherein if the driving value of all the phases is situated in the linearity zone of the chart during a step, new control parameters are transmitted comprising said driving values to a driving device able to control the polyphase converter.

3. The method of claim 1, wherein if the driving value of at least one phase is located in the non-linearity zone of the chart and if more than one value subsists in all the differences, during a step a previously selected difference is deleted and said step c) is reiterated.

4. The method of claim 1, wherein if the driving value of a phase is located in the non-linearity zone of the chart, and if all the differences are empty, during a step the control parameters are selected and the driving value of the phase in a non-linearity zone is calculated by subtracting the smallest difference from the control parameter of the phase if the corrective value associated with the smallest difference is less than the control parameter of the phase or by adding the smallest difference to the control parameter of the phase if the corrective value associated with the smallest difference is greater than the control parameter of the phase, and new control parameters are transmitted comprising said driving value and each control parameter of other phases to a driving device able to control the polyphase converter.

5. The method of claim 1, wherein if the control parameter of at least two phases is located in the non-linearity zone of the chart and if all the differences are empty, different combinations of corrective values are determined each forming a driving vector, each driving vector is transformed into a two-dimensional driving vector, a control parameter vector comprising the control parameter of each of the phases is transformed into a two-dimensional reference vector, a quadratic error of each two-dimensional driving vector is determined with respect to the two-dimensional reference vector and the two-dimensional driving vector associated with a smallest quadratic error determined is selected.

6. The method of claim 5, comprising a step during which the two-dimensional driving vector associated with the smallest quadratic error is transformed into the control parameter vector and a combination of control parameters is transmitted to a driving device able to control a three-phase converter.

7. System for optimizing a control for a polyphase power converter, characterized in that it comprises means for implementing a method of control according to claim 1 in such a way that the polyphase power converter delivers a balanced system of voltages.

8. System of control in voltage of a polyphase power converter for the implementation of a method according to claim 1, characterized in that it comprises a regulation device able to generate for each phase the drive setpoint value, a control optimization system receiving a drive setpoint value delivered by the regulation device and able to control the polyphase power converter, the optimization system delivering a driving value developed from the drive setpoint value in such a way that the polyphase power converter delivers a balanced voltage system.

\* \* \* \* \*